(No Model.) 2 Sheets—Sheet 2.
W. GILLETTE.
ELECTRIC SIGNALING DEVICE.
No. 545,357. Patented Aug. 27, 1895.
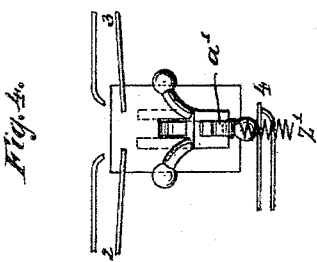
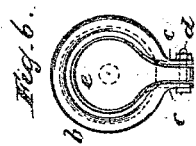
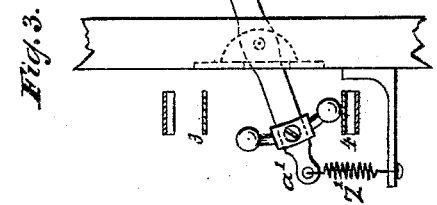
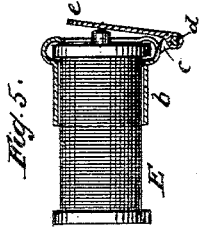
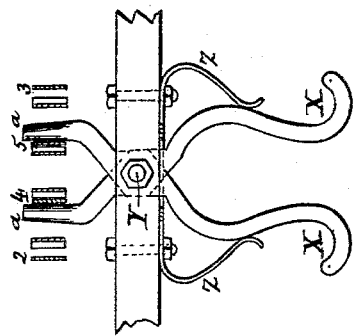
WITNESSES:
INVENTOR:
Webster Gillette.
BY
ATTORNEYS.

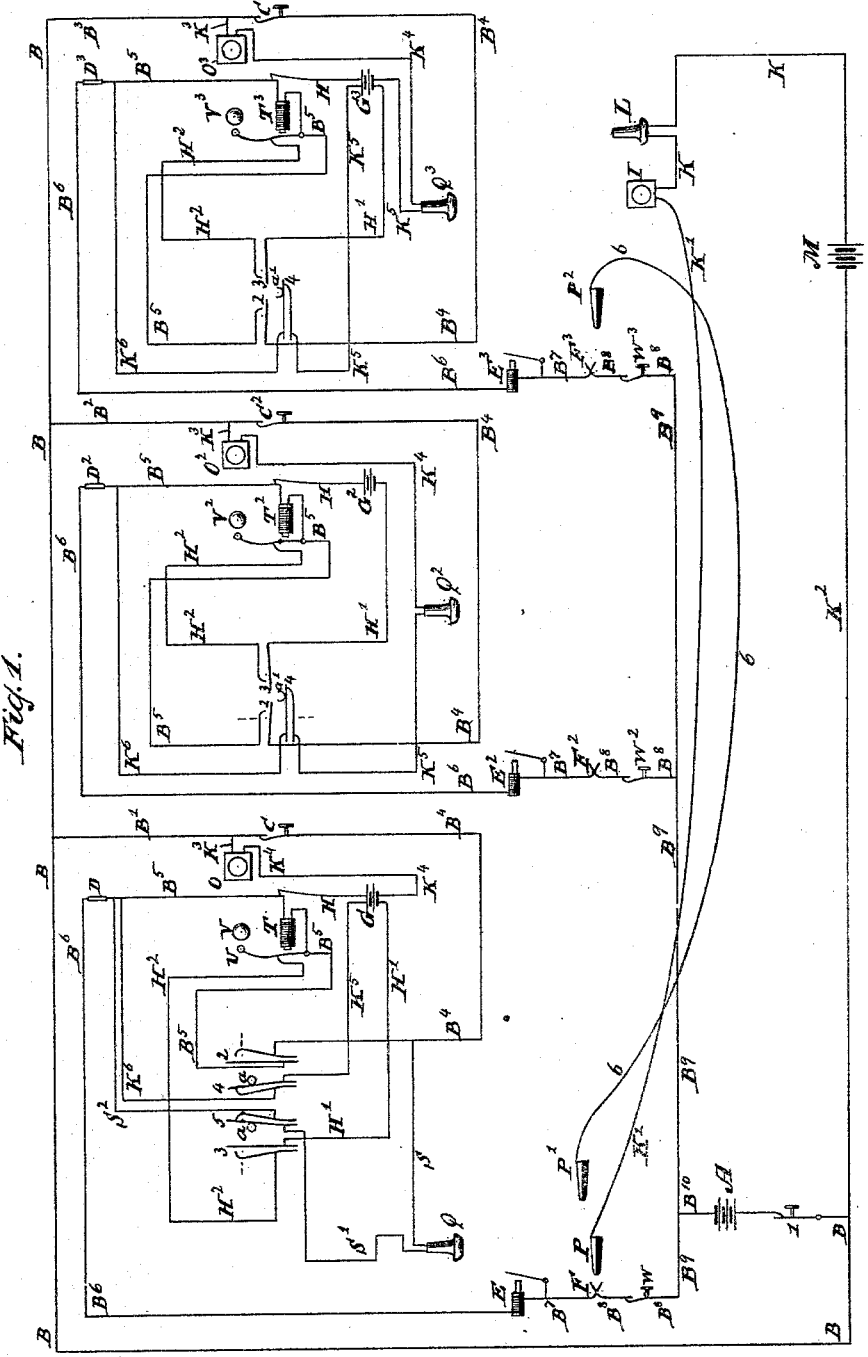

UNITED STATES PATENT OFFICE.

WEBSTER GILLETTE, OF NEW YORK, N. Y., ASSIGNOR TO ALEXANDER S. WILLIAMS, OF SAME PLACE.

ELECTRIC SIGNALING DEVICE.

SPECIFICATION forming part of Letters Patent No. 545,357, dated August 27, 1895.

Application filed July 5, 1894. Serial No. 516,623. (No model.)

*To all whom it may concern:*

Be it known that I, WEBSTER GILLETTE, a citizen of the United States, residing at New York, in the county and State of New York, have invented new and useful Improvements in Electric Signaling Devices, of which the following is a specification.

The object of this invention is to provide a signaling device of simple construction and reliable in its operation; and the invention resides in the novel features of construction set forth in the following specification and claims and illustrated in the annexed drawings, in which—

Figure 1 is a diagram of the signaling device. Figs. 2, 3, and 4 show methods of closing or opening circuits. Fig. 5 shows a sectional elevation of an annunciator. Fig. 6 is a front elevation of Fig. 5.

In this device is employed a battery A, conveniently designated as the "main" battery. From this battery extends a conductor B, having at any suitable point a circuit-breaker 1 of any suitable well-known form. From conductor B extend one or more branches $B'$ $B^2$ $B^3$, each branch running to a suitable point or station—as, for example, to separate rooms in a hotel. Taking branch $B'$, the current flows thence through a circuit-breaker C to conductor $B^4$, to the contact-maker 2, which, when closed, will conduct the current to conductor $B^5$, into which conductor is placed an electromagnet T, so as to be vitalized and permanently attract bell-hammer U to hold the latter at rest, so that bell V is not sounded, the conductor $B^5$ continuing on to a thermostat D, whence conductor $B^6$ conducts the current to electromagnet E to vitalize the latter for holding up any suitable drop or hotel annunciator. From the electromagnet E the current passes along conductor $B^7$, through spring-jack F to conductors $B^8$, $B^9$, and $B^{10}$ back to battery A. Said system also comprises a local battery G, having a conductor H, extending to bell-magnet T or to conductor $B^5$, containing said magnet, and a conductor $H'$, extending to contact-closer 3, which, when closed, will connect conductor $H'$ to conductor $H^2$, leading to bell-hammer U, which latter, when attracted by magnet T, breaks the contact between conductors $H^2$ and H or $B^5$; but when the hammer drops away from magnet T the current of local battery G is closed, or, in other words, the local battery G has the well-known make-and-break contact, so that when said battery G comes into play the bell V is sounded.

Said device also includes a battery M connecting by conductor K with a telephonic receiver L and transmitter I, whence conductor $K'$ runs to the jack-plug P, which latter is one-sided, so that when inserted into spring-jack F the conductor $B^7$ will communicate through the conducting portion of plug P with conductor $K'$, while the conductor $B^8$ will contact with the insulating part of plug P to cut out the main battery A. This battery M is conveniently termed a "transmitter-battery," as it serves to transmit messages. The current of battery M can now be traced as follows: along conductor $K^2$ to conductor B, and thence to branch $B'$ and conductor $K^3$ to transmitter O, thence along conductor $K^4$ to local battery G, thence along conductor $K^5$ to contact-closer 4, which, when closed, will take the current to conductor $K^6$ to conductor $B^5$, already named, and thermostat D and conductors $B^6$ $B^7$ to jack F and jack-plug P, and along conductor $K'$ and transmitter I and receiver L in conductor K to battery M. This circuit may be called a "transmitter-circuit," as it connects with transmitter O, as seen. Said battery M also establishes a circuit as follows: along conductors $K^2$, B, and branch $B'$, as before, to conductors $B^4$ S to receiver Q, thence through conductor $S'$ to contact-closer 5, which, when closed, will take the current to conductor $S^2$ and thence to conductors $B^5$ through thermostat D and through conductor $B^6$, magnet E, conductor $B^7$, jack F, jack-plug P, conductor $K'$, transmitter I, receiver L, and conductor K back to battery M.

When the device is at rest, the receiver Q being in its place will hold the contact-closers 2 and 3 closed and 4 and 5 open or broken. If now the main battery A is cut out or the circuit through branch $B'$ is broken by actuating circuit-breaker C, or, if desired, circuit-breaker W, suitably located, as in conductor $B^8$, or by inserting plug P into spring-jack F the local battery is left free to actuate the bell-hammer U, so that it will begin to sound bell V and at the same time the drop at E is released by the devitalization of magnet E. The receiver Q being now taken off its place or support, the contact-closers 2 and 3 are opened and the closers 4 and 5 are closed, this being the position shown in the drawings as occupied by the respective contact-closers 2, 3, 4, and 5. The jack-plug P being inserted at F, the telephonic transmitter and receiver O and Q are in communication with the instruments I L. By placing, for example, the instruments I L and contact-breaker W or spring-jack F with annunciator E in a hotel office and the instruments O Q with contact-breaker C and alarm V in a room the office and room can be brought into communication.

The currents, when speaking through branch B', may be traced as follows: From battery M along conductors $K^2$ B B' $K^3$ to transmitter O, along conductor $K^4$, battery G, conductor $K^5$, contact-maker 4, along conductors $K^6$ $B^5$, thermostat D, conductor $B^6$, magnet E, conductor $B^7$, out of spring-jack F, to plug P, along conductor K', through transmitter I and receiver L, along conductor K to battery M. This current forms what may be called the "transmitter-circuit."

The receiver-circuit may be traced as follows: From battery M along conductors $K^2$ B B', through circuit-breaker C along conductors $B^4$ S, through receiver Q, conductor S', contact-closer 5, conductors $S^2$ $B^5$, thermostat D, conductor $B^6$, annunciator-magnet E, conductor $B^7$, from jack-spring F to plug P, along conductor K' to transmitter I and receiver L, along conductor K to battery M.

Referring to the station including transmitter O it may be noted that if the contact-breakers 1 or W are open a portion of the current from battery G leaking along conductors H and $B^5$, including magnet T, will pass through contact 2, conductor $B^4$, contact-breaker C, conductor $K^3$, transmitter O, and conductor $K^4$ to battery G. Should the contact-breaker C be open a portion of the current from battery G leaking along conductors H and $B^5$ will pass to thermostat D and along conductors $B^6$ $B^7$ $B^8$ $B^9$ $B^{10}$ battery A, conductors B B' $K^3$, transmitter O, and conductors $K^4$ to battery G. The resistance of the transmitter O is such that this leakage is not sufficient to derange or hinder the proper function of the device, the current from battery G passing mainly through bell-magnet T and through the hammer or vibrating contact V.

In the modification shown connected to branch $B^2$ the contact-closer 5 is omitted, together with conductors S S' $S^2$, the receiver $Q^2$ being in this case connected to conductors $K^4$ $K^5$, and these conductors $K^4$ and $K^5$ not being connected to local battery $G^2$. The current from battery M, which in flowing through branch B' was aided in its course by local battery G, is, when flowing through branch $B^2$, compelled to work without the aid of the local battery $G^2$.

The currents in the case of the device at branch $B^2$ can be traced as follows: When the device is at rest the contact-closers 2 and 3 are closed and the closer 4 open. The current from main battery A now flows through conductors B $B^2$ and breaker $C^2$, along conductor $B^4$ and contact-closer 2 to conductor $B^5$, including bell-magnet $T^2$, through thermostat $D^2$, conductor $B^6$, electromagnet $E^2$, and conductors $B^7$ $B^8$ $B^9$ $B^{10}$ to battery A. The actuation of circuit-breaker $C^2$ or $W^2$, or the insertion of plug P into spring-jack $F^2$, will cause local battery $G^2$ to sound alarm $V^2$ and will actuate annunciator at $E^2$, as understood. The receiver $Q^2$ being taken off its place or hook, closers 2 and 3 are opened and closer 4 is shut, as illustrated. The jack-plug P being inserted at spring-jack $F^2$, the battery A is cut out of branch $B^2$ and the current from battery M establishes communication between instruments I L and instruments $O^2$ $Q^2$, said current passing conductors $K^2$ B $B^2$ $K^3$ to transmitter $O^2$, conductor $K^4$, receiver $Q^2$, conductor $K^5$, closer 4, conductors $K^6$ $B^5$ and thermostat $D^2$, along $B^6$ to $E^2$, and thence along $B^7$ to plug P in spring-jack $F^2$, thence along conductor K', instruments I L, and conductor K to battery M.

In the modification shown in connection with branch $B^3$ the contact-closer 5 is also omitted, together with conductors S S' $S^2$, the receiver $Q^3$ being in this case again connected to conductors $K^4$ $K^5$, but the local battery $G^3$ is here shown inserted into conductor $K^5$, so that the latter does not run as from receiver $Q^2$ direct to closer 4, but from receiver $Q^3$ first to local battery $G^3$ and then to closer 4.

The currents in the case of the device at branch $B^3$ can be traced as follows: When the device is at rest the contact-closers 2 and 3 are closed and the closer 4 open. The current from main battery A now flows through conductors B $B^3$ to breaker $C^3$ and along conductor $B^4$ and contact-closer 2 to conductor $B^5$, including bell-magnet $T^3$, through thermostat $D^3$, conductor $B^6$, electromagnet $E^3$, and conductor $B^7$, jack $F^3$, and conductors $B^8$ $B^9$ $B^{10}$ to battery A. The actuation of circuit-breaker $C^3$ or $W^3$, or the insertion of plug P into spring-jack $F^3$, will cause local battery $G^3$ to sound alarm $V^3$ and to actuate annunciator $E^3$, as understood. The receiver $Q^3$ being taken off its place or hook, closers 2 and 3 are opened and closer 4 is shut, as illustrated. The jack-plug P being inserted at spring-jack $F^3$, the battery A is cut out of branch $B^3$ and the current from battery M establishes communication between instruments I L and instruments $O^3$ $Q^3$, said current passing through conductors $K^2$ B $B^3$ $K^3$ to transmitter $O^3$, conductor $K^4$, receiver $Q^3$, along conductor $K^5$, in which is local battery $G^3$ to closer 4, conductors $K^6$ $B^5$, and thermostat $D^3$, along $B^6$ to $E^3$, and thence along B⁷ to plug P in jack F³, and along conductor K', instruments I L, and conductor K to battery M.

Referring to the station including transmitter O³, when a break is made at W³ or 1 a portion of the current from battery G³ leaking along conductors H and B⁵, including magnet T³, will pass through contact 2 and along conductor B⁴, contact C³, conductor K³, through transmitter O³, along conductor K⁴, through receiver Q³, and along conductor K⁵ to battery G³. Should the contact-breaker C³ be open, a portion of the current from battery G³, leaking along conductor B⁵ and thermostat D³, will pass along conductors B⁶, B⁷, B⁸, B⁹, B¹⁰, B, B³, and K³, through transmitter O³, along conductor K⁴, through receiver Q³, and along conductor K⁵ to battery G³. The resistance of transmitter O³ and receiver Q³ is such that their leakage is not sufficient to derange or hinder the proper function of the device, the current from battery G³ passing mainly through the bell-magnet T³ and through the hammer or vibrating contact.

If desired, two rooms—as, for example, the rooms of branches B' and B³—can be brought into communication with one another by a conductor 6, having jack-plugs P' P², which, contacting with the conductors B⁷ of spring-jacks F F³ and insulating-conductors B⁸ at said spring-jacks, will establish communication as follows: Starting from local battery G along conductor K⁴ to transmitter O, conductors K³ B' B to B³, thence along K³ to transmitter O³ and conductor K⁴ to transmitter Q³, along conductor K⁵, including battery G³, to closer 4 and conductor K⁶, thermostat D³, conductor B⁶, magnet E³, and conductor B⁷ to plug P², along conductor 6 to plug P', along conductor B⁷, magnet E, and conductor B⁶ to thermostat D and conductors B⁵ K⁶ and closer 4 to conductor K⁵ and local battery G. The receiver Q is included in the circuit passing along conductor S', contact-closer 5, conductors S² B⁵, thermostat D, conductor B⁶, annunciator-magnet E, conductor B⁷, jack F, plug P', conductor 6, plug P², jack F³, conductor B⁷, annunciator-magnet E³, conductor B⁶, thermostat D³, conductors B⁵ K⁶, closer 4, conductor K⁵, including local battery G³, receiver Q³, conductor K⁴, transmitter O³, conductors K³, B³, B, B', B⁴, and S to transmitter Q. Similarly one of the plugs P' or P² might be inserted in spring-jack F² to connect with either spring-jack F or F³. The contact-breaker 1, when actuated, will cut off the current of main battery A from all the branches B' B² B³ simultaneously, leaving all the local batteries G G² G³ in each room or station free to actuate their individual alarms, which will continue to ring until this circuit-breaker 1 is again closed. This furnishes a suitable call where all stations are to be called at once—as for example, in case of fire or other emergency. As noticed, the circuit-breakers W W² W³ can be dispensed with, as the insertion of a one-sided jack-plug in jack F, F², or F³ will cut out main battery A the same as the actuation of a breaker W, W², or W³.

The closers 2, 3, 4, and 5 are conveniently operated, as follows: The supporting-lever arms X X of levers X a, fulcrumed at Y, are compressed by springs Z Z, so that the lever-arms a a will compress or effect contact through the closers or springs 4 and 5. When, however, the receiver Q is not in use and is suspended or jammed in between arms X X, so as to spread the latter, as also arms a a, the closers 4 and 5 are released to break contact, and the circuit is established by the arms a closing 2 and 3. In case only three closers are used, the lever X' a', Figs. 3 and 4, can be used, the arm X' of which, when moved or held against the resistance of spring Z' by the receiver Q² or Q³, being supported when out of use by arm X', will cause arm a' to effect contact at the closers 2 and 3, while when relieved of the receiver Q² or Q³ the spring Z' will move arm a' to open closers 2 and 3 and close 4.

A convenient way of making the annunciators is to slip over an electromagnet—as, for example, E—a cap b, having in its front face or disk a central aperture for the projection of the magnet-core. Parts of this front face being cut and bent to form lips c for the support of a pivot d, the annunciator-tag e can be hinged on this pivot, so as to be slipped on or off with cap b. By this means the annunciator may be rapidly and directly connected to the coil. When the tag e has dropped or swung down on the devitalization of magnet E, said tag remains down until raised by hand or otherwise within the field of the revitalized-magnet, so as to be again attracted or held.

What I claim as new, and desire to secure by Letters Patent, is—

1. A main circuit and battery A, a transmitter battery, and a local battery and circuit, combined with an alarm in the local circuit, a receiver, a transmitter, a contact maker for switching the main circuit out of action and the local circuit into action, and contact makers for switching the transmitter battery and the receiver and transmitter into the main circuit, substantially as described.

2. A contact breaker for a telephone system comprising the normally open contacts 2, 3, 4 and 5, the contacts 4 and 5 being located between the contacts 2 and 3, a lever pair having one lever arm interposed between the contacts 2, 4 and another lever arm interposed between the contacts 3, 5, and a spring for normally closing the levers toward the inner contacts 4 and 5, said levers being adapted for the reception of the telephone transmitter to spread said levers for freeing the inner contacts and for closing the outer contacts, substantially as described.

3. An electro magnet provided with a cap $b$ having a central aperture for the magnet core and parts of the flange surrounding said aperture cut and bent to form lips $c$ a pintle $d$ in said lips and an annunciator tag hinged to the pintle whereby the annunciator may be rapidly and directly connected to the coil, substantially as described.

In testimony whereof I have hereunto set my hand in the presence of two subscribing witnesses.

WEBSTER GILLETTE.

Witnesses:
WM. C. HAUFF,
E. F. KASTENHUBER.